(12) United States Patent
Taylor

(10) Patent No.: US 10,978,720 B2
(45) Date of Patent: Apr. 13, 2021

(54) THERMAL BATTERY ASSEMBLY AND RELATED METHODS

(71) Applicant: Winchester Interconnect Hermetics, LLC, Melbourne, FL (US)

(72) Inventor: Edward Allen Taylor, Melbourne, FL (US)

(73) Assignee: WINCHESTER INTERCONNECT HERMETICS, LLC, Melbourne, FL (US)

( * ) Notice: Subject to any disclaimer, the term of this patent is extended or adjusted under 35 U.S.C. 154(b) by 57 days.

(21) Appl. No.: 16/397,591

(22) Filed: Apr. 29, 2019

(65) Prior Publication Data

US 2019/0379061 A1   Dec. 12, 2019

Related U.S. Application Data

(60) Provisional application No. 62/681,959, filed on Jun. 7, 2018.

(51) Int. Cl.
*H01M 6/36* (2006.01)
*H01M 2/10* (2006.01)

(52) U.S. Cl.
CPC ............ *H01M 6/36* (2013.01); *H01M 2/1016* (2013.01)

(58) Field of Classification Search
None
See application file for complete search history.

(56) References Cited

U.S. PATENT DOCUMENTS

| 4,327,162 A * | 4/1982 | Borger .............. H01M 6/36 429/120 |
| 6,308,518 B1 | 10/2001 | Hunter |
| 7,926,169 B1 | 4/2011 | Dixon et al. |
| 10,461,311 B1 * | 10/2019 | Vissers .............. H01M 10/39 |
| 10,497,908 B2 * | 12/2019 | Reid .............. H01M 2/0456 |
| 2006/0110657 A1 | 5/2006 | Stanton et al. |

(Continued)

FOREIGN PATENT DOCUMENTS

| DE | 19958411 A1 * | 6/2001 | .......... H01M 2/1094 |
| JP | H07226228 A | 8/1995 | |
| JP | 2000030739 A | 1/2000 | |

OTHER PUBLICATIONS

Eagle Picher Technologies, LLC; "A Bundle of Energy;" www.eaglepicher.com; 2018; pp. 1-6.

(Continued)

*Primary Examiner* — Scott J. Chmielecki
(74) *Attorney, Agent, or Firm* — Allen, Dyer, Doppelt, + Gilchrist, P.A. Attorneys at Law

(57) ABSTRACT

A thermal battery assembly may include a thermal battery that includes a housing and a plurality of internal pins extending therefrom. The thermal battery assembly may also include an enclosure surrounding the housing in spaced relation therefrom and maintaining a vacuum therebetween and a connection header. The connection header may include a flange coupled to said enclosure, at least one dielectric body coupled to the flange, and external pins extending through the at least one dielectric body. Each external pin may be coupled to a corresponding internal pin along a path having at least one bend therein to accommodate relative movement between the housing and the enclosure.

19 Claims, 3 Drawing Sheets

(56) References Cited

U.S. PATENT DOCUMENTS

| | | | |
|---|---|---|---|
| 2009/0202891 A1* | 8/2009 | Morganstein | F42C 11/008 |
| | | | 429/80 |
| 2012/0052336 A1* | 3/2012 | Chung | H01G 9/21 |
| | | | 429/11 |
| 2012/0244393 A1 | 9/2012 | Stanek et al. | |
| 2013/0183551 A1* | 7/2013 | Rastegar | H01M 6/36 |
| | | | 429/51 |
| 2013/0292130 A1* | 11/2013 | Bennett | H01M 2/30 |
| | | | 166/351 |
| 2018/0149352 A1* | 5/2018 | Kodak | F01K 3/262 |

OTHER PUBLICATIONS

United States of America Department of Defense; "Electroexplosive Subsystems, Electrically Initiated, Design Requirements and Test Methods;" Military Standard; MIL-STD-1512 (USAF); Mar. 21, 1972.

* cited by examiner

US 10,978,720 B2

THERMAL BATTERY ASSEMBLY AND RELATED METHODS

RELATED APPLICATION

The present application claims the priority benefit of provisional application Ser. No. 62/681,959 filed on Jun. 7, 2018, the entire contents of which are herein incorporated by reference.

TECHNICAL FIELD

The present embodiments are directed to the field of batteries, and more particularly to thermal batteries and related methods.

BACKGROUND

One type of battery is a thermal battery. A thermal battery is typically inert before activation, and thus it may be stored for a relatively long time period without adversely affecting performance such as, for example, operational duration.

A thermal battery typically includes cells each having an anode, electrolyte, and cathode. The electrolyte maintains separation between the anode and cathode until activation.

A thermal battery may be activated mechanically, pyrotechnically, and/or with a rapid acceleration or change in temperature. Upon activation, a pyrotechnical thermal energy source releases heat which causes the electrolyte to melt or permit ion exchange between the anode and cathode. Thus energy is provided. The heat generated by the ion exchange may be dissipated relatively quickly while electrical energy may be provided for a duration in the range of a few seconds to up to an hour, for example.

SUMMARY

A thermal battery assembly may include a thermal battery that includes a housing and a plurality of internal pins extending therefrom. The thermal battery assembly may also include an enclosure surrounding the housing in spaced relation therefrom and maintaining a vacuum therebetween. The thermal battery assembly may further include a connection header that includes a flange coupled to the enclosure, at least one dielectric body coupled to the flange, and a plurality of external pins extending through the at least one dielectric body. Each external pin may be coupled to a corresponding internal pin along a path having at least one bend therein to accommodate relative movement between the housing and the enclosure.

The thermal battery assembly may further include an evacuation port coupled to the enclosure. The thermal battery assembly may also include a hermetic seal between the flange and adjacent portions of the enclosure, for example.

The at least one dielectric body may define a hermetic seal between the plurality of external pins and adjacent portions of the flange. The enclosure may include a bottom, a top, and a hermetic seal therebetween, for example.

The thermal battery assembly may also include a plurality of spacers between the housing and the enclosure. The plurality of spacers may each include a base member and a post extending therefrom, for example.

The base member may include titanium, and the post may include at least one of ceramic and aluminum oxide, for example. The at least one dielectric body may include a plurality of dielectric bodies, and the flange may have a plurality of openings therein receiving respective ones of the plurality of dielectric bodies.

A method aspect is directed to a method of making a thermal battery assembly that includes a thermal battery including a housing and a plurality of internal pins extending therefrom. The method may include positioning an enclosure surrounding the housing in spaced relation therefrom and maintaining a vacuum therebetween and coupling a flange of a connection header to the enclosure. The method may further include coupling at least one dielectric body of the connection header to the flange and positioning a plurality of external pins of the connection header to extend through the at least one dielectric body. Each external pin may be coupled to a corresponding internal pin along a path having at least one bend therein to accommodate relative movement between the housing and the enclosure.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
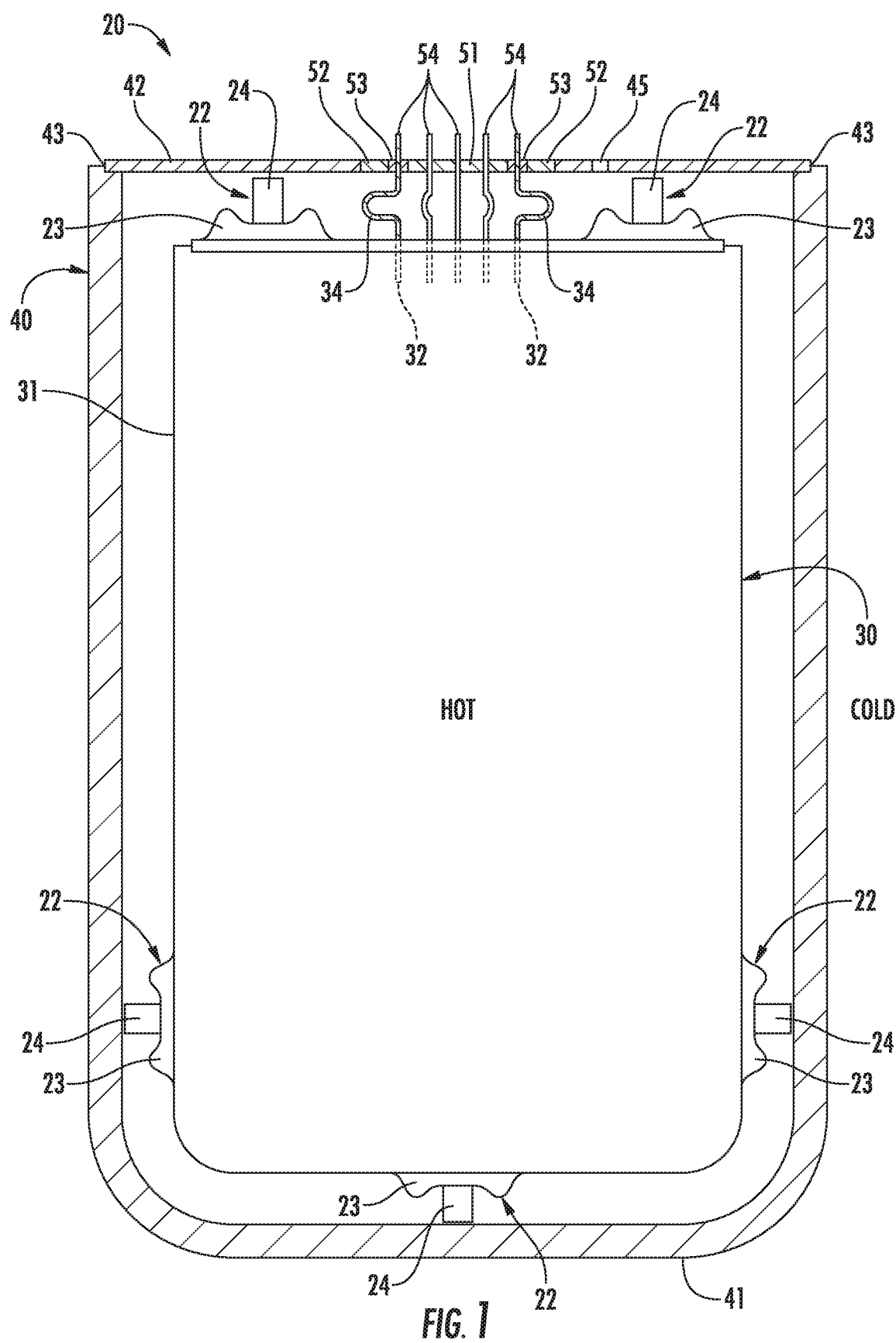
FIG. 1 is a cross-sectional view of a thermal battery assembly according to an embodiment.
Figure 2:
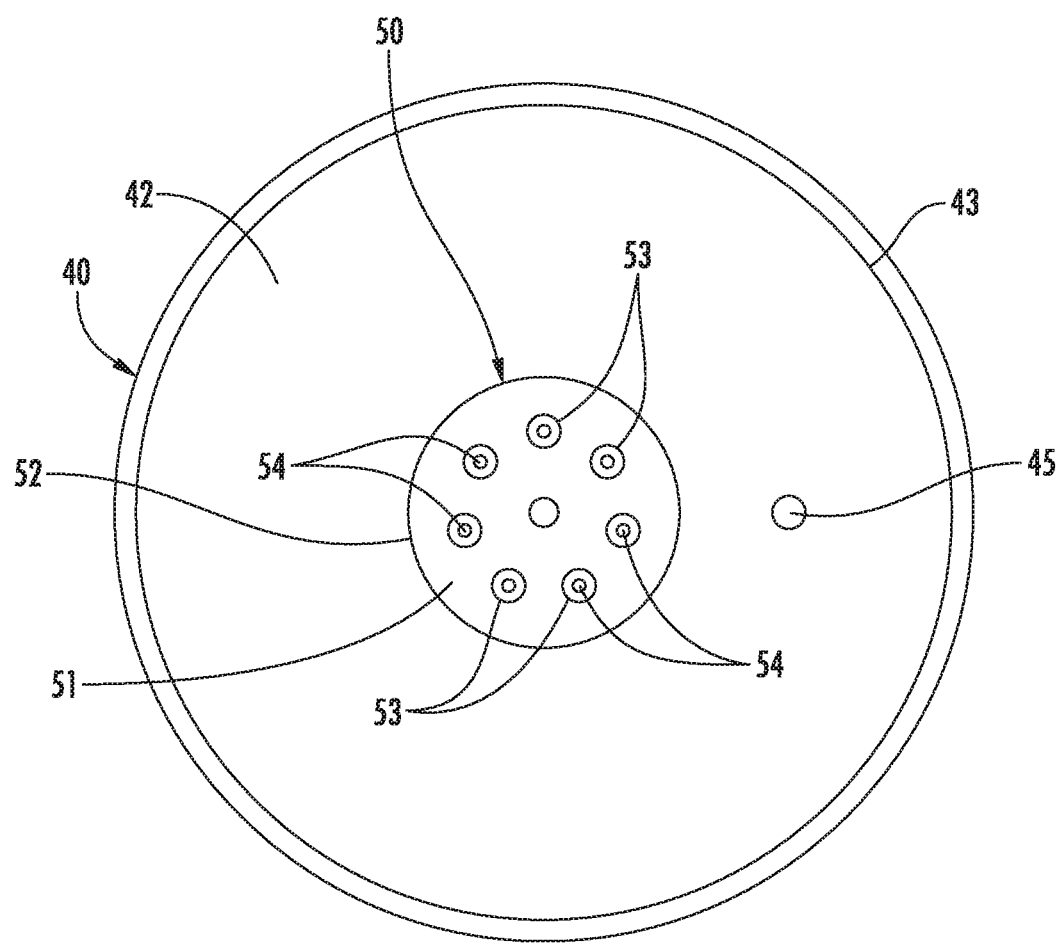
FIG. 2 is a top view of a thermal battery assembly according to an embodiment.

Referring to FIGS. 1 and 2, a thermal battery assembly 20 includes a thermal battery 30. The thermal battery 30 includes a housing 31 and internal pins 32 extending from the housing.

The thermal battery assembly 20 also includes an enclosure 40 surrounding the housing 31 in spaced relation therefrom so as to maintain a vacuum therebetween. The enclosure 40 includes a bottom 41, a top 42, and a hermetic seal 43 therebetween. The enclosure 40 is illustratively cylindrical in shape and generally matches the shape of the housing 31 of the thermal battery 30. The enclosure 40, which may be metal (e.g., titanium, stainless steel), may be another shape, for example, and match the shape of the thermal battery 30. The hermetic seal 43 may be in the form of a welded joint, for example, or other seal as will be appreciated by those skilled in the art.

An evacuation port 45 is coupled to the enclosure 40. The evacuation port 45 is illustratively in the top 42 of the enclosure 40 and may include a check valve or other device to effectuate the vacuum between the enclosure and the housing 31.

Spacers 22 are between the housing 31 and the enclosure 40 and may maintain the spacing between the housing and enclosure. More particularly, the spacers 22 are spaced apart within the space between the enclosure 40 and the housing 31. The spacers 22 each include a base member 23 and a post 24 extending from the base member. The base member 23 may have a round shape, and be flexible so the base member undergoes compression during expansion, for example, when the thermal battery 30 is activated. The post 24 may have a cylindrical shape. Of course, the post may have another shape.

The base member 23 may include titanium, for example. The base member 23 may include other and/or additional materials or metals. The post 24 may include ceramic or aluminum oxide. The post 24 may include other and/or additional materials.

Figure 3:
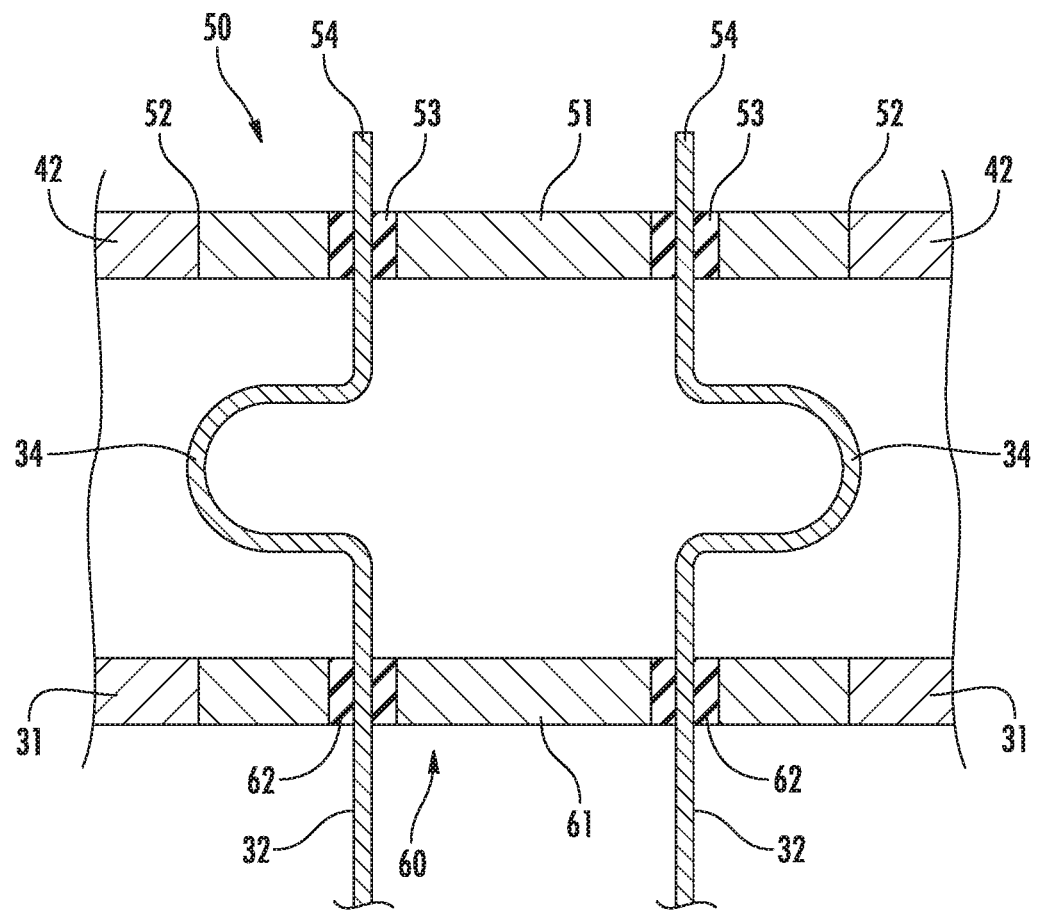
FIG. 3 is an enlarged cross-sectional view of a portion of a thermal battery assembly according to an embodiment.

Referring now additionally to FIG. 3, the thermal battery assembly 20 also includes a connection header 50 that includes a flange 51 coupled to the enclosure 40. More particularly, the top 42 of the enclosure 40 has an opening in which the flange 51 fits or rests. A hermetic seal 52, for example, in the form of a welded joint, is between the flange 51 and adjacent portions of the enclosure 40. Dielectric bodies 53 are coupled to the flange 51. More particularly, the flange 51, which may include metal, has openings receiving respective dielectric bodies 53 therein. The dielectric bodies 53 may be circular in shape to match respective openings in the flange 51 and also may each have an opening therein, for example, to receive an external pin 54 therethrough. In other words, the external pins 54 extend through respective dielectric bodies 53. The dielectric bodies 53 may each define a hermetic seal between the external pins 54 and adjacent portions of the flange 51.

The external pins 54 may be stainless steel, beryllium copper, a copper alloy, and/or an iron alloy. Of course, the external pins 54 may be or include another and/or additional materials. The external pins 54 may match the internal pins 32, for example, and may have a function associated therewith (e.g., power, trigger, diagnostic, etc.).

In some embodiments, the dielectric bodies 53 may be in the form of a dielectric coating over the external pins 54 or other dielectric body type such that the external pins, which are electrically conductive, do not come in electrical contact with the flange 51. There may be any number of dielectric bodies 53, as will be appreciated by those skilled in the art.

Each external pin 54 is illustratively coupled to a corresponding internal pin 32 along a path having a bend 34 therein to accommodate relative movement between the housing 31 and the enclosure 40. There may be more than one bend 34 along the path. As will be appreciated by those skilled in the art, the bend 34 advantageously increases thermal isolation and may provide mechanical separation between the enclosure 40 and the housing 31.

The thermal battery assembly 20 may include a further connection header 60 that may include a flange 61 coupled to the housing 31, and more particularly a top of the housing and aligned with the connection header 50. Similar to the connection header 50 carried by the enclosure 40, the further connection header 60 includes dielectric bodies 62 coupled to the flange (e.g., carried within openings in the flange). The internal pins 32 extend through corresponding dielectric bodies 62. In other words, the further connection header 60 is structurally similar to the connection header 50. In some embodiments, the connection headers 50, 60 may be different, either or both in material and/or form.

During operation of the thermal battery 30 or upon activation thereof, heat is released from the thermal battery as a byproduct of the chemical reactions to provide energy. Retaining the heat may permit the thermal battery 30 to generate power or electricity more efficiently. Retaining the heat may also permit a thermal battery 30 to be packed more safely and into tighter spaces. Still further, retaining the heat may also permit current of the thermal battery 30 to be output for a longer time period.

A method aspect is directed to a method of making a thermal battery assembly 20 that includes a thermal battery 30 including a housing 31 and a plurality of internal pins 32 extending therefrom. The method includes positioning an enclosure 40 surrounding the housing 31 in spaced relation therefrom and maintaining a vacuum therebetween and coupling a flange 51 of a connection header 50 to the enclosure. The method also includes coupling at least one dielectric body 53 of the connection header 50 to the flange 51 and positioning a plurality of external pins 54 of the connection header to extend through the at least one dielectric body. Each external pin 54 is coupled to a corresponding internal pin 32 along a path having at least one bend 34 therein to accommodate relative movement between the housing 31 and the enclosure 40.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A thermal battery assembly comprising:
 a thermal battery comprising a housing, a thermally-activated electrolyte carried by said housing, and a plurality of internal pins extending from said housing;
 an enclosure surrounding said housing in spaced relation therefrom and maintaining a vacuum therebetween; and
 a connection header comprising
  a flange coupled to said enclosure,
  at least one dielectric body coupled to said flange, and
  a plurality of external pins extending through said at least one dielectric body, each external pin coupled to a corresponding internal pin along a path having at least one bend therein to accommodate relative movement between said housing and said enclosure.

2. The thermal battery assembly of claim 1 further comprising an evacuation port coupled to said enclosure.

3. The thermal battery assembly of claim 1 further comprising a hermetic seal between said flange and adjacent portions of said enclosure.

4. The thermal battery assembly of claim 1 wherein said at least one dielectric body defines a hermetic seal between said plurality of external pins and adjacent portions of said flange.

5. The thermal battery assembly of claim 1 wherein said enclosure comprises a bottom, a top, and a hermetic seal therebetween.

6. The thermal battery assembly of claim 1 further comprising a plurality of spacers between said housing and said enclosure.

7. The thermal battery assembly of claim 6 wherein said plurality of spacers each comprises a base member and a post extending therefrom.

8. The thermal battery assembly of claim 7 wherein said base member comprises titanium.

9. The thermal battery assembly of claim 7 wherein said post comprises at least one of ceramic and aluminum oxide.

10. The thermal battery assembly of claim 1 wherein said at least one dielectric body comprises a plurality of dielectric bodies; and wherein said flange has a plurality of openings therein receiving respective ones of the plurality of dielectric bodies.

11. A connection header for a thermal battery assembly comprising a thermal battery comprising a housing, a thermally-activated electrolyte carried by the housing, and a plurality of internal pins extending from the housing, and an enclosure surrounding the housing in spaced relation therefrom and maintaining a vacuum therebetween, the connection header comprising:
  a flange coupled to the enclosure;
  at least one dielectric body coupled to said flange; and
  a plurality of external pins extending through said at least one dielectric body, each external pin to be coupled to a corresponding internal pin along a path having at least one bend therein to accommodate relative movement between the housing and the enclosure.

12. The connection header of claim 11 further comprising a hermetic seal between said flange and adjacent portions of the enclosure.

13. The connection header of claim 11 wherein said at least one dielectric body defines a hermetic seal between said plurality of external pins and adjacent portions of said flange.

14. The connection header of claim 11 wherein said at least one dielectric body comprises a plurality of dielectric bodies; and wherein said flange has a plurality of openings therein receiving respective ones of the plurality of dielectric bodies.

15. A thermal battery assembly comprising:
  a thermal battery comprising a housing and a plurality of internal pins extending therefrom;
  an enclosure surrounding said housing in spaced relation therefrom and maintaining a vacuum therebetween; and
  a connection header comprising
    a flange coupled to said enclosure,
    at least one dielectric body coupled to said flange,
    a plurality of external pins extending through said at least one dielectric body, each external pin coupled to a corresponding internal pin along a path having at least one bend therein to accommodate relative movement between said housing and said enclosure, and
    a plurality of spacers between said housing and said enclosure, each spacer comprising a base member and a post extending therefrom.

16. The thermal battery assembly of claim 15 further comprising an evacuation port coupled to said enclosure.

17. The thermal battery assembly of claim 15 further comprising a hermetic seal between said flange and adjacent portions of said enclosure.

18. The thermal battery assembly of claim 15 wherein said at least one dielectric body defines a hermetic seal between said plurality of external pins and adjacent portions of said flange.

19. The thermal battery assembly of claim 15 wherein said enclosure comprises a bottom, a top, and a hermetic seal therebetween.

\* \* \* \* \*